United States Patent [19]

Moss

[11] 4,386,743
[45] Jun. 7, 1983

[54] LINE BRAKE FOR SPIN CAST REELS

[75] Inventor: Elvis W. Moss, Tulsa, Okla.

[73] Assignee: Brunswick Corporation, Skokie, Ill.

[21] Appl. No.: 218,922

[22] Filed: Dec. 22, 1980

[51] Int. Cl.³ .............................................. A01K 89/01
[52] U.S. Cl. ............................................... 242/84.2 A
[58] Field of Search .................... 242/84.2 A, 84.21 A

[56] References Cited

U.S. PATENT DOCUMENTS

| | | | |
|---|---|---|---|
| 2,911,165 | 11/1959 | Sarah | 242/84.2 A |
| 3,094,296 | 6/1963 | Nurmse | 242/84.21 A |
| 3,325,115 | 6/1967 | Sarah | 242/84.2 A |

*Primary Examiner*—Billy S. Taylor
*Attorney, Agent, or Firm*—John G. Heimovics

[57] ABSTRACT

This invention comprehends a closed face spinning style fishing reel wherein a spinner head is mounted on a center shaft and is movable between a line retrieval position, a line snubbing or line braking position, and a line casting position. The line snubbing or line braking position of the spinner head is provided by moving the spinner head forward to trap or snub the line between a line braking ring on the spinner head and the inside surface of the front cover of the reel. The line braking ring is mounted on the spinner head for movement in a plane parallel to the front surface of the spinner head to orient the line braking ring in concentric mating relationship with respect to the surface of the spinner head thereby assuring positive line snubbing or line braking when desired.

8 Claims, 7 Drawing Figures

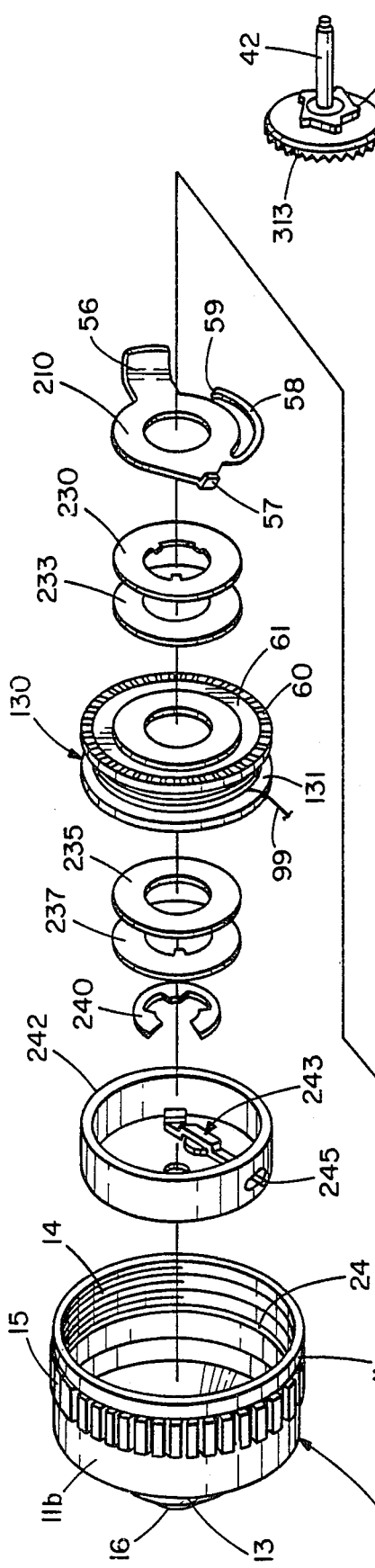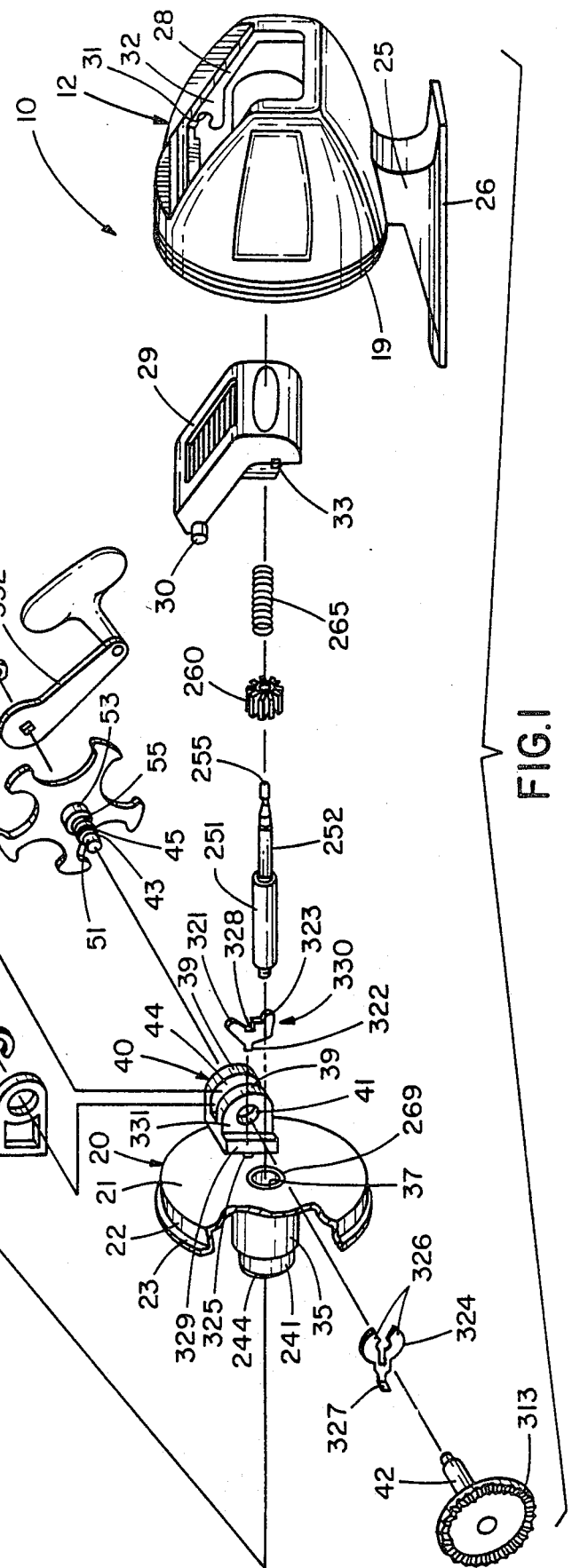

LINE BRAKE FOR SPIN CAST REELS

DESCRIPTION

TECHNICAL FIELD

This invention relates to closed face spinning style fishing reels and, more particularly, relates to a positive line snubbing or line braking mechanism in the reel.

BACKGROUND ART

Most spinning style fishing reels have some mechanism for snubbing or braking the pay out of the line. The mechanism is particularly useful during the initial back swing motion of the casting rod. As the casting rod approaches the high point of the casting arc, the snubbing or braking mechanism is released whereupon the line is free to pay out as part of the cast.

A common form of line snubbing or line braking mechanism is shown in U.S. Pat. No. 3,088,691 to Hull, issued May 7, 1963, and provides a brake ring in the housing against which the rear lip of spinner head engages to pinch the line therebetween thereby preventing the line from being cast or paid out.

Another form of line braking mechanism is shown in U.S. Pat. No. 3,105,651 to Hull, issued Oct. 1, 1963, wherein a brake ring is fixed on the front of the spinner head such that forward movement of the spinner head moves the brake ring against the inside surface of the front cover to pinch the line therebetween for preventing the line from being cast or paid out.

The prior art line braking mechanisms, although effective, have had problems in that they rely on the absolute concentricity of the mating parts. In the case of U.S. Pat. No. 3,088,691 to Hull, that means that the brake ring and rear lip of the spinner head must both be concentric in shape and concentrically mounted. The same is true for the inside surface of the front cover and the brake ring of U.S. Pat. No. 3,105,651 to Hull. Failure of the mating elements to be concentric and concentrically mounted means that the line might not be caught and braked when desired, which can spoil the effectiveness of the cast.

The present invention is directed to overcoming one or more of the problems as set forth above.

DISCLOSURE OF INVENTION

This invention relates to closed face spinning style fishing reels having a line snubbing or line braking mechanism that positively snubs or brakes the line each time a brake lever on the reel is moved to the line braking position. A line braking ring is mounted on the planar front face of the spinner head in a manner that permits the line braking ring to shift or slide relative to the spinner head in a plane parallel to the plane of the front face of the spinner head. The spinner head is moved forward by actuation of the brake lever whereupon the line braking ring will contact the inner surface of the front cover. In the event the line braking ring is not concentric with the front cover, the contact of the front cover on the line braking ring will shift the line braking ring to a concentric position relative to the front cover. In the concentric position, the line will be snubbed between the line braking ring and the inner surface of the front cover to arrest further pay out of the line.

The mounting of the line braking ring on the spinner head may be affected by a spinner head drive nut that serves both to lock the spinner head on the end of the center shaft and to provide for limited planar shifting or sliding of the line braking ring relative to the spinner head. The ability to adjust the line braking ring to a concentric position relative to a mating front cover provides the reel with a line brake mechanism that positively grabs and holds the line when the brake lever is actuated, thereby affording the fisherman with a reel that can be reliably braked during line casting.

BRIEF DESCRIPTION OF DRAWINGS

FIG. 1 is an exploded view of a reel embodying the invention;

FIG. 1A is a rear perspective of the gear and ratchet of the crankshaft;

BEST MODE FOR CARRYING OUT THE INVENTION

Figure 2:
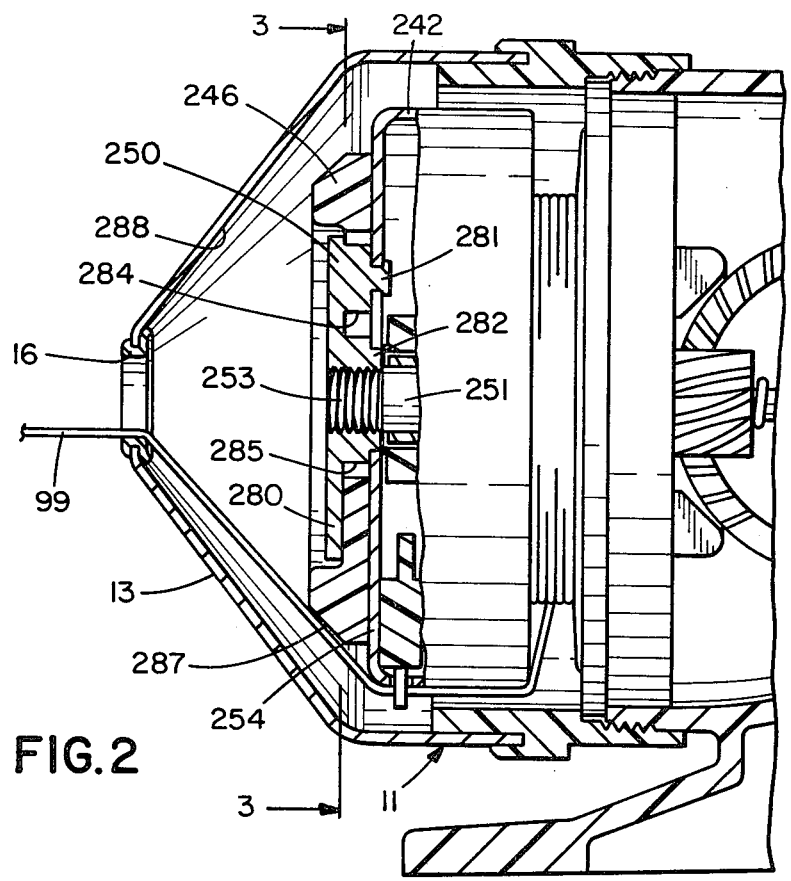
FIG. 2 is a cross-sectional view taken along the line 2—2 of FIG. 3.
Figure 3:
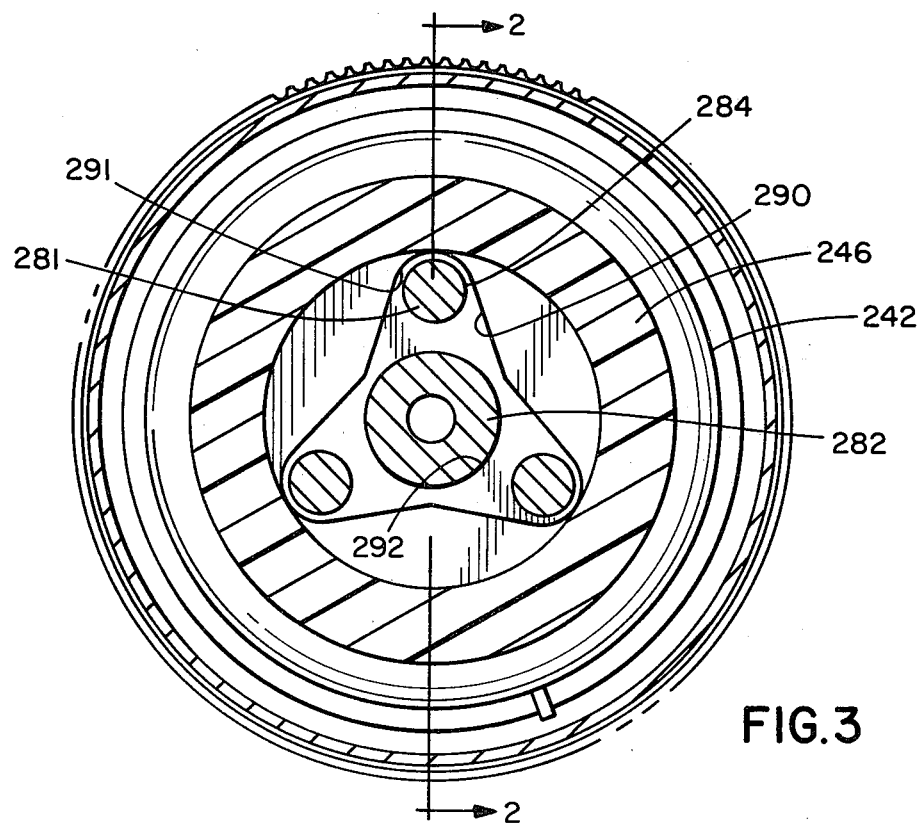
FIG. 3 is a cross-sectional view taken along the line 3—3 of FIG. 2.

Referring first to FIG. 1, there is shown a reel, including a closed face housing 10, having a two-part front cup-shaped cover 11 and a rear cup-shaped cover 12. The front cover 11 has a ring or cylindrically-shaped first part 11a and a cone-shaped second part 11b. The ring or cylindrically-shaped first part 11a of the front cover 11 is molded from a high impact strength plastic, such as ABS. The cone-shaped second part 11b of the front cover 11 is formed of metal, such as aluminum. The rear cover 12 can be formed of a platable grade ABS with a chrome or nickel plating. The cone-shaped second part 11b has a generally annular rearward edge portion engaging in a forwardly facing locking groove 17 formed on the second part 11b of the cover 11. The cone-shaped second part 11b has means for rigidly locking the second part 11b to the first part 11a. The cone-shaped second part 11b of the cover 11 has a conical front portion 13 including a circular line opening which mounts an annular line guide 16 in a known manner. The cylindrical first part 11a of the front cover 11 has helical threads 14 formed on the rearmost internal surface thereof and has knurled gripping portions 15 formed on the external surface thereof.

A reel body 20 is provided and includes a circular mounting plate or deck plate 21 which has a forwardly extending cylindrical sleeve portion 22 integrally formed around the outer periphery thereof. The reel body 20 may be made of plastic material, such as ABS or a glass filled polycarbonate. The forward edge of the sleeve 22 has a flange 23 extending radially outwardly beyond the outer surface of the sleeve portion 22. The cylindrical first part 11a of the front cover 11 is undercut rearward of the internal thread 14 to provide a rearwardly facing shoulder 24 axially spaced from the end of the internal thread 14. The reel body 20 with the radially extending flange 23 is inserted in the rear opening of the front cover 11 with the flange 23 bearing against the shoulder 24 in the undercut portion. The rear cover 12, which has on its forwardly facing end portion an external thread 19, is threaded into the internal thread 14 of the front cover 11 until the forwardly facing edge of the rear cover 12 engages the radially outwardly extending flange 23 to trap the reel body 20 between the front cover 11 and the rear cover 12. The rear cover 12 has an integrally molded, radially extending stem 25 with a mounting foot 26 on the outer end thereof for attachment to the appropriate part of a fishing rod. The mounting foot 26 is to be attached to the upper surface of a fishing rod for use.

The rear cover 12 has a rearwardly facing opening 28 that is substantially rectangular in shape extending through a sloped upper portion and vertical rear portion thereof. A one-piece thumb button 29 has a shape substantially mating with the shape of the opening 28 in the rear cover 12 and has a pair of sidewardly extending pivots 30 on the upper forward side edges thereof which snap into slotted pivot opening 31 formed in the adjacent side walls 32 of the opening 28. A pair of sidewardly extending tabs 33 are formed on the lower side edges of the thumb button 29 such that with the thumb button 29 assembled from the inside of the rear cover 12, the sidewardly extending pivots 30 will snap into the slotted openings 31 in the walls 32 of the rear cover 12 with the sidewardly extending tabs 33 abutting a vertical inner surface of the rear cover 12 adjacent the opening 28. The tabs 33 prevent the thumb button 29 from pivoting rearwardly out of the opening 28 in the rear cover 12.

A central hub 35 is carried by and projects forward of the deck plate 21 concentric with the sleeve 22 with a drag plate 210, back spool washer 230, back flat drag washer 233, spool assembly 130, front flat drag washer 235, frong spool washer 237, all retained on the hub 35 by means of spool retainer clip 240 which fits into a groove (not shown in FIG. 1) aligned with a shoulder separating the hub 35 from a reduced diameter front portion 241 of hub 35.

A center shaft 251 is mounted in a sleeve bearing 269 seated in a center hole 37 extending through the deck plate 21 and hub 35, with a spinner head assembly 242 threaded onto the forward threaded end of the shaft 251. The spinner head assembly 242 partially surrounds the forward flange of the spool assembly 130 with a supply of fishing line 99 being wound on a spool 131 of the spool assembly 130. The line 99 is wound or unwound from the spool 131 over the spinner head assembly 242 and through the line guide 16 in the front cover 11.

The center shaft 251 is slidably and rotatably mounted in the sleeve bearing 269 in the deck plate 21. A pinion gear 260 is splined on a reduced diameter spined portion 252 of the center shaft 251 and is resiliently maintained in a forward position against the deck plate 21 by a center shaft spring 265. The spring 265 bears against an abutting end 255 on the center shaft 251 to urge the pinion gear 260 against the deck plate 21 and to urge the center shaft 251 in a rearward direction relative to the deck plate 21. The splined connection between the pinion gear 260 and center shaft 251 permits the axial sliding motion of the shaft 251 relative to the pinion gear 260 while at the same time rotation of the pinion gear 260 will rotate the center shaft 251.

Depressing the thumb button 29 moves the center shaft 251 and spinner head assembly 242 forward relative to the hub 35. As the spinner head assembly 242 moves forward, a pickup pin mechanism 243, mounted on spinner head assembly 242, will move forward of and will disengage from the front portion 241 of the hub 35 and from a cam 244 on the axial face of the front portion 241 of the hub 35 thereby retracting a pickup pin 245 from its extended position radially outward of the spinner head assembly 242. With the thumb button 29 fully depressed, a line brake member (not shown in FIG. 1) on the forward face of the spinner head assembly 242 will be urged against the inside of the cone-shaped part 11b of the front cover 11 to trap the line 99 therebetween to prevent casting of the line from the reel. Releasing the pressure on the thumb button 29 will maintain the spinner head assembly 242 in a forward casting position, but the spring 265 will retract the center shaft 251 and the spinner head assembly 242 enough to unclamp the line 99 whereby the spinner head assembly 242 will not interfere with the fishing line 99 which can then be cast freely from the reel.

The deck plate 21 also includes a rearwardly projecting boss 40 having spaced apart legs 39 with aligned transverse openings 41 therethrough for receiving, in a concentric manner, a crankshaft 42 surrounded, in part, by a cylindrical post 43. The boss 40 has a slot 44 between the legs 39, which slot 44 extends transverse to the axis of the opening 41. The slot 44 aligns with a slot (not shown in FIG. 1) in the deck plate 21 with a slide drag actuator 247 positioned in the slots and being threadably engaged with a threaded portion 45 of the post 43. The drag actuator 247 extends through the aligned slots and forward of the deck plate 21 and is moved by rotation of the post 43 in a direction along the axis of the post 43 between the spaced apart legs 39 of the boss 40. The degree of drag braking pressure applied to the spool 131 through the drag actuator 247 is selectively and precisely controllable through a star wheel 50 mounted on the post 43 where the post 43 projects outward of the boss 40. The post 43 has spaced bearing surfaces 51 and 53 which seat in the openings 41. A retainer clip 54 engages in a slot 55 at the junction between the bearing surface 53 and the threads 45 on the post 43, which slot 55 aligns with one wall of the slot 44 so that the star wheel 50 and post 43 can be rotated relative to the boss 40 without the post 43 moving axially relative to the boss 40.

The projecting contact head 248 of the drag actuator 247 engages with an arcuately curved extended ramp cam 56 on the drag plate 210. The drag plate 210 has an anchoring tab 57 located diametrically opposite the cam 56, which tab 57 engages in a recess (not shown in FIG. 1) in the front surface of the deck plate 21. A cantilever arm 58 has a peripheral connection with the drag plate 210 and extends along an arc parallel to a peripheral portion of the drag plate 210. The cantilever arm 58 has an axially facing tip 59 engaging with serrations 60 on the axially facing surface of one flange 61 of the spool 131. The drag plate 210 bears against the back spool washer 230, back flat drag washer 233, spool assembly 130, front flat drag washer 235, front spool washer 237, all of which are backed against the fixed retainer clip 240. The contact head 248 of the drag actuator 247 engages with the cam 56 and, as it is moved radially outward of the drag actuator 247, the pressure or drag on the spool 131 will be increased and, as the drag actuator 247 is moved radially inward on the cam 56, the pressure or drag on the spool 131 will be decreased. The drag actuator 247 is advanced or moved radially inward (decreased drag) by rotating the star wheel 50 in one direction and is retracted or moved radially outward (increased drag) by rotating the star wheel 50 in the opposite direction.

The crankshaft 42, with a gear 313 attached at one end, is inserted through the post 43 in the boss 40 and has a handle 332 attached by means of a nut 333 to the other end of said crankshaft 42. The gear 313 meshes with the pinion gear 260 on the center shaft 251 so that rotation of the crank handle 332 will rotate the center shaft 251 and spinner head assembly 242.

An anti-reverse assembly 330, which is associated with the crankshaft 42, includes a ratchet 336, shown in FIG. 1A, fixed on the back of the gear 313 for rotation with the gear 313 and crankshaft 42. The anti-reverse assembly 330 further includes a pivotable pawl 321 having a pivot tab 322, a pawl tooth 323, and a pawl actuator 324. The pawl pivot tab 322 extends into a slot 325 formed in deck plate 21, the slot 325 having one wall in alignment with the one wall 329 which is offset radially inward toward the center shaft 251 from the end face 331 of the boss 40. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the midportion of the pawl 321. The pawl 321 with the pivot tab 322 in the slot 325 will have one face of the pawl 321 against the wall 329 of the boss 40 and will have the pawl tooth 323 aligned with the ratchet 336. The crankshaft 42, when telescoped in the post 43 and boss 40, will locate the pawl actuator 324 between the ratchet 336, fixed on the back face of gear 313, and the end face 331 of the boss 40 in the vicinity of the opening 41 in the boss 40, so that the pawl actuator 324 is offset slightly from the pawl 321 with the transverse actuator tab 327 engaged in the recess 328 of the pawl 321. Rotation of the crank handle 332 in a counterclockwise direction, as viewed in FIG. 1, will pivot the crankshaft 42 and the pawl actuator 324 in a counterclockwise direction which will pivot the pawl 321 in a clockwise direction around pawl pivot tab 322 to move the pawl tooth 323 out of alignment with the teeth of the ratchet 336. The crank handle 332 will, therefore, be permitted to be rotated in that direction without interference. The gripping resistance between the pawl actuator 324 and the crankshaft 42 will be overcome as soon as the pawl 321 pivots to its extreme position, whereupon the crankshaft 42 continues to rotate relative to the pawl actuator 324. Rotation of the handle 332 in the clockwise direction moves the pawl actuator 324 in the clockwise direction with the tab 327 pivoting the pawl 321 in a counterclockwise direction to move the pawl tooth 323 into the path of the ratchet teeth to stop further rotation of the crankshaft 42 and handle 332 in that direction.

DESCRIPTION OF THE PREFERRED EMBODIMENTS

Referring more generally to FIGS. 2–6 in conjunction with FIGS. 1 and 1A, a line braking member or ring 246 is shown carried on a transverse or front wall 254 of the spinner head assembly 242 by a retainer element 250 which is threaded onto the threaded end portion 253 of the center shaft 251. More specifically, the retainer element 250 has a disc-shaped body portion 280 to which is secured three equally spaced apart transversely extending rivets 281 and a center hub 282 that is internally threaded at 283. Each rivet 281 and the center hub 282 have spacing collars 284, 285, respectively, all of which collars have the same axial thickness. Additional optional cutouts 286 are made through the body portion 280 to reduce weight without reducing the strength of the retainer element 250.

Figure 4:
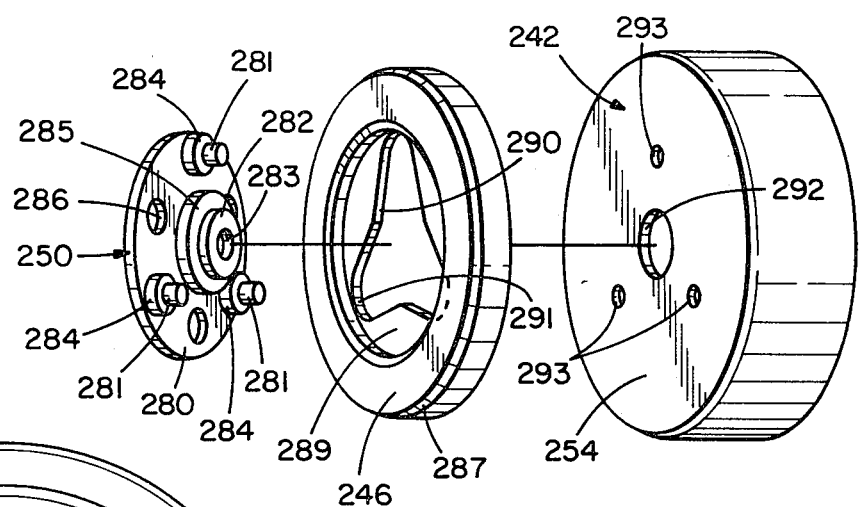
FIG. 4 is an exploded perspective view of the principal parts of a preferred embodiment of the line braking mechanism.
Figure 5:
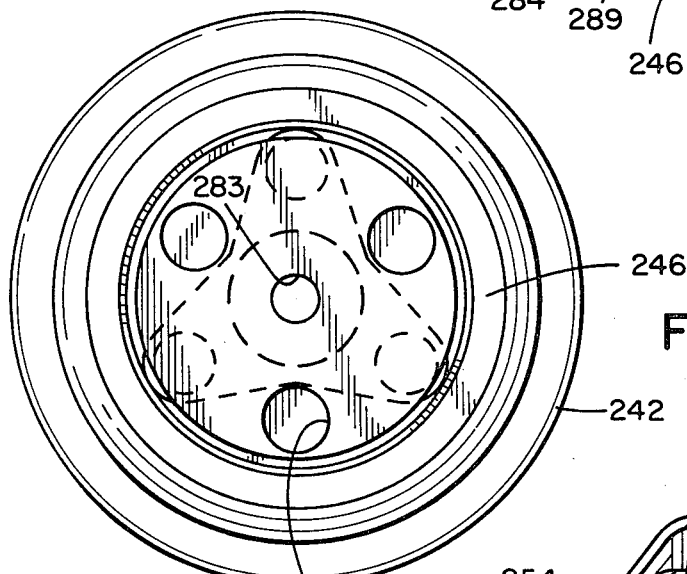
FIG. 5 is an end elevational view of the line braking ring assembled on the spinner head.
Figure 6:
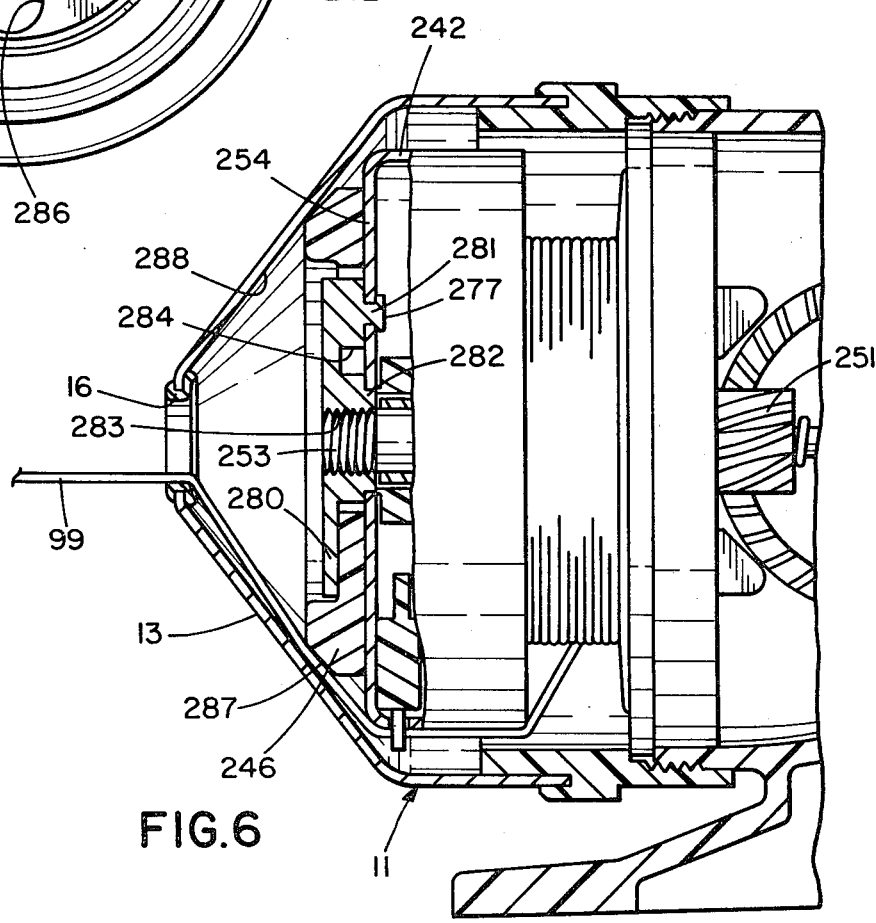
FIG. 6 is a cross-sectional view similar to FIG. 2 only with the spinner head and line braking ring in the line braking position.

The line brake ring 246, as best shown in FIG. 4, is circular in configuration having an axially extending continuous member with a frustoconical braking surface 287, which surface has substantially the same taper as the inner surface 288 of the cone-shaped front portion 13 of the cover 11. An integral web 289 joins the rear portion of the brake ring 246 and has a three-legged cutout 290 in the midportion thereof. Each leg 291 of the cutout 290 is curved and has a size that is larger than the outside diameter of the spacing collars 284 on the rivets 281. The spinner head assembly 242 is provided with a center aperture 292 and three equally spaced apart rivet apertures 293 located in a manner to receive the rivets 281. The retainer element 250 is aligned with the cutout 290 in the braking ring 246 with one collar 284 in each oversized leg 291 of the cutout 290 and with the rivets 281 passing through in the apertures 293 in the transverse wall 254. The rivets 281 are struck over to form rivet heads 277 on the inside of the spinner head assembly 242. The collar 285 on the hub 282 nests in the center aperture 292 such that the collar 285 and rivets 281 will rigidly and fixedly secure the retainer element 250 to the spinner head assembly 242 with the threaded portion 283 being threaded onto threaded portion 253 on the center shaft 251. The axial thickness of the center web 289 of the braking ring 246 is slightly less than the axial dimension of the spacing collars 284 on the rivets 281 such that the brake ring 246 may shift or slide or translate relative to the spinner head assembly 242 in a plane parallel to the planar transverse wall 254. The disc-shaped body portion 280 of the retainer element 250 overlaps the web 289 so as to retain the braking ring 246 on the spinner head assembly 242. The degree or amount of relative shifting is determined by the spacing provided between the outer diameters of the spacing collars 284 and the diameter of the legs 291 of the cutout 290 (FIG. 3) and by the spacing between the disc-shaped body portion 280 and the inside diameter of the axially extending member of the braking ring 246. Although the retainer element 250 shown and described serves the dual function of providing the spinner head mounting means to the center shaft 251 and of providing the translatory movement for the brake ring 246, it is understood that the two functions could be provided by separate means without departing from the spirit of the invention. The rivets 281 can be separate or integral with the collar 284 and/or the portion 280.

The frustoconical surface 287 of the braking ring 246 is made substantially concentric with the cone-shaped inner surface 288 of the front cover. Heretofore, however, it was possible either for the longitudinal axis of the center shaft 251 or for the mounting of the spinner head assembly 242 on the center shaft 251 or for other parts to be mounted in the reel off center with respect of the inner surface of cone-shaped front cover such that a braking ring rigidly attached to the spinner head assembly 242 would not be concentric with respect to the front cover 11 so that when the spinner head assembly 242 and braking ring 246 were advanced into line braking position, the braking ring 246 would contact the front cover 11 at one limited arc about its periphery with the remaining periphery of the braking ring 246 being spaced from the front cover 11. The result was that the line had a great possibility of not being gripped whereupon a faulty cast was executed. The improved line braking ring 246 and its mounting for translatory movement relative to the transverse front wall of the spinner head assembly 242 makes it possible for the braking ring 246 to shift to a location where the frustoconical braking surface 287 is concentric with the cone-shaped front surface of the cover providing the reel with a positive braking action each time one is required.

Other aspects, objects and advantages of this invention can be obtained from a study of the drawings, the disclosure and the appended claims.

I claim:

1. In a closed face spinning reel including a front cover, a rear cover and a reel body, the front cover having a conically-shaped portion tapering to a line guide, the reel body having a deck plate with a forwardly extending hub, a center shaft extending axially through the hub along the longitudinal axis of the reel, a spinner head carried on a forward end of the center shaft, a crank drive mechanism mounted on the deck plate for rotating the center shaft, means carried by the reel and contacting the center shaft for selectively moving the center shaft and the spinner head forward relative to the deck plate, and means for urging the center shaft and spinner head rearward relative to the deck plate, the improvement comprising:
   (a) line braking means carried by the spinner head,
   (b) attaching means loosely fastening the line braking means to the spinner head for limited movement of the line braking means relative to the spinner head in a plane transverse to the longitudinal axis of the reel whereby movement of the spinner head forward in the front cover causes engagement of the line braking means with the inside surface of the conically-shaped portion of the front cover, and wherein the engagement of the line braking means with the inside surface causes the line braking means to shift and properly align and mate the line braking means with the conically-shaped portion,
   (c) the attaching means is a retainer secured to he spinner head and having a body portion overlapping a web on the braking means, the body portion of the retainer being spaced from adjacent portions of the braking means to permit the braking means to move relative to the body portion of the retainer,
   (d) the retainer is spaced from the spinner head by plural spacing collars, and
   (e) the collars are formed on rivets extending from the retainer and being anchored to the spinner head.

2. In a reel as claimed in claim 1 wherein said line braking means has a frustoconical braking surface substantially mating with the conically-shaped portion of the cover.

3. In a reel as claimed in claim 1 wherein a center hub is mounted on the retainer and has means for securing the retainer on the center shaft.

4. In a reel as claimed in claim 3 wherein the last-named means is threaded to a threaded portion of the center shaft.

5. In a reel as claimed in claim 3 wherein a collar is provided on the center hub for spacing the body portion of the retainer from the spinner head.

6. In a closed face spinning reel including a front cover, a rear cover and a reel body, the front cover having a conically-shaped portion tapering to a line guide, the reel body having a deck plate with a forwardly extending hub, a center shaft extending axially through the hub, a crank drive mechanism mounted on the deck plate for rotating the center shaft, actuator means for selectively moving the center shaft and the spinner head forward relative to the deck plate, and means for urging the center shaft and spinner head rearward relative to the deck plate, the improvement comprising:
   (a) a spinner head,
   (b) braking means carried by the spinner head,
   (c) fastening means substantially rigidly attaching the spinner head to the center shaft and loosely attaching the braking means to the spinner head for limited movement of the braking means relative to the spinner head in a plane parallel to a planar body portion of the spinner head, movement of the actuator means moves the center shaft and spinner head forward in the front cover to trap a line between the braking means and the inside surface of the conically-shaped portion of the front cover, the braking means shifting in the plane parallel to the spinner head body portion in response to contact of the braking means with the inside surface to properly align and mate the braking means with the conically-shaped portion of the front cover,
   (d) the fastening means has a body portion overlapping a portion of the braking means, and means spacing the body portion from the spinner head to permit the movement of the braking means relative to the spinner head,
   (e) the spacing means are plural spacing collars, and
   (f) the spacing collars are formed on rivets extending from the body portion to an anchored attachment to the spinner head.

7. In a reel as claimed in claim 6 wherein each spacing collar is spaced from an adjacent portion of the braking means to limit movement of the braking means relative to the spinner head.

8. In a reel as claimed in claim 7 wherein the means for rigidly attaching the spinner head to the center shaft is comprised of a center hub carried by said body portion of the retainer, and means in the center hub for engaging and attaching the spinner head to the center shaft.

* * * * *